United States Patent
Ohashi et al.

(10) Patent No.: US 9,525,317 B2
(45) Date of Patent: Dec. 20, 2016

(54) AUTOMOTIVE ROTARY ELECTRIC MACHINE

(75) Inventors: Atsushi Ohashi, Chiyoda-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 14/239,431

(22) PCT Filed: Nov. 11, 2011

(86) PCT No.: PCT/JP2011/076072
§ 371 (c)(1),
(2), (4) Date: Feb. 18, 2014

(87) PCT Pub. No.: WO2013/069152
PCT Pub. Date: May 16, 2013

(65) Prior Publication Data
US 2014/0167542 A1 Jun. 19, 2014

(51) Int. Cl.
*H02K 5/04* (2006.01)
*H02K 5/00* (2006.01)
*H02K 5/02* (2006.01)
*H02K 5/06* (2006.01)
*H02K 5/08* (2006.01)
(Continued)

(52) U.S. Cl.
CPC ...... *H02K 5/04* (2013.01); *H02K 5/00* (2013.01); *H02K 5/02* (2013.01); *H02K 5/06* (2013.01); *H02K 5/08* (2013.01); *H02K 5/10* (2013.01); *H02K 5/22* (2013.01); *H02K 5/225* (2013.01)

(58) Field of Classification Search
CPC .............. H02K 5/00; H02K 5/02; H02K 5/04; H02K 5/06; H02K 5/08; H02K 5/10; H02K 5/15; H02K 5/22; H02K 5/225
USPC .................... 310/89, 91, 71; 174/72 A, 72 R
See application file for complete search history.

(56) References Cited

U.S. PATENT DOCUMENTS 2,735,025 A * 2/1956 Wiggins ................ H04R 17/00
310/328
6,140,722 A 10/2000 Ballard et al.
(Continued)

FOREIGN PATENT DOCUMENTS

EP        0521493 A2    1/1993
EP        0853369 A2    7/1998
(Continued)

OTHER PUBLICATIONS

International Search Report of PCT/JP2011/076072 dated Dec. 6, 2011.
(Continued)

*Primary Examiner* — Terrance Kenerly
*Assistant Examiner* — Alexander Singh
(74) *Attorney, Agent, or Firm* — Sughrue Mion, PLLC; Richard C. Turner (57) ABSTRACT

An automotive rotary electric machine according to the present invention includes: a mounting bolt that is inserted through a penetrating aperture that is formed on a bottom portion of a protective cover and that is fixed to a portion at a first axial end of a casing; and a metal mounting device that is fixed to a portion of the mounting bolt that projects out through the penetrating aperture, and a harness clamp is held by the metal mounting device.

9 Claims, 5 Drawing Sheets

(51) Int. Cl.
*H02K 5/22* (2006.01)
*H02K 5/10* (2006.01)

(56) References Cited

U.S. PATENT DOCUMENTS

| | | | | |
|---|---|---|---|---|
| 2004/0135443 | A1* | 7/2004 | Tajima | H02K 5/20 |
| | | | | 310/68 D |
| 2006/0273671 | A1* | 12/2006 | Oohashi | H02K 11/046 |
| | | | | 310/68 D |
| 2014/0203672 | A1* | 7/2014 | Kimata | H02K 5/10 |
| | | | | 310/52 |

FOREIGN PATENT DOCUMENTS

| | | |
|---|---|---|
| JP | 11-018257 A | 1/1999 |
| JP | 2001-346356 A | 12/2001 |
| JP | 2005-102353 A | 4/2005 |
| JP | 4151348 B2 | 9/2008 |
| WO | 0229958 A1 | 4/2002 |

OTHER PUBLICATIONS

Communication from the European Patent Office dated May 12, 2016 in counterpart application No. 11875376.3.

* cited by examiner

AUTOMOTIVE ROTARY ELECTRIC MACHINE

CROSS REFERENCE TO RELATED APPLICATIONS

This is a National Stage of International Application No. PCT/JP2011/076072 filed Nov. 11, 2011, the content of all of which is incorporated herein by reference in its entirety.

TECHNICAL FIELD

The present invention relates to an automotive rotary electric machine such as an automotive alternator, etc., and particularly relates to a supporting construction for electrical wiring that is wired around an automotive rotary electric machine that is mounted onto an automobile.

BACKGROUND ART

Much electrical wiring is wired around an automotive alternator that is mounted onto an automobile. Since wire breakages are more likely to occur if this electrical wiring is too long and vibrates due to engine vibration, etc., the electrical wiring is fixed partially to a vehicle body or to the automotive alternator.

In conventional automotive alternators, a resin rear cover is mounted onto a rear-end frame so as to cover a rectifying apparatus, a voltage controlling apparatus, and a brush apparatus, etc., that are mounted outside the rear-end frame, and electrical wiring is fixed to a harness clamp that is mounted onto a protruding portion that is disposed so as to protrude integrally from the rear cover (see Patent Literature 1, for example).

CITATION LIST

Patent Literature

Patent Literature 1: Japanese Patent No. 4151348 (Specification)

SUMMARY OF THE INVENTION

Problem to be Solved by the Invention

In conventional automotive alternators, because the harness clamp that fixes the electrical wiring is mounted onto a protruding portion that is formed integrally on the resin rear cover, supporting strength for the electrical wiring cannot be increased sufficiently. Thus, vibration of the electrical wiring that results from vehicle vibration cannot be suppressed, and there has been a risk that problems may arise such as the electrical wiring breaking, and even the rear cover being damaged.

The present invention aims to solve the above problems and an object of the present invention is to provide an automotive rotary electric machine that can suppress the occurrence of wire breakages in electrical wiring by mounting a harness clamp that fixes the electrical wiring onto a metal mounting device that is mounted onto a mounting bolt that is fixed to a casing to increase the supporting strength of the harness clamp sufficiently, and to suppress vibration of the electrical wiring that results from vehicle vibration, and that can also prevent the occurrence of damage to a protective cover that results from vibration of the electrical wiring by not forming the protective cover into a supporting member for the electrical wiring.

Means for Solving the Problem

In order to achieve the above object, according to one aspect of the present invention, there is provided an automotive rotary electric machine including: a rotor that is disposed inside a casing so as to be fixed to a shaft that is rotatably supported by the casing; a stator including: a stator core; and a stator winding that is mounted onto the stator core, the stator being supported by the casing so as to surround the rotor; a rectifier that rectifies alternating-current electric power that is generated by the stator winding, the rectifier being fixed to the casing so as to be disposed outside a first axial end of the casing; a voltage regulator that adjusts magnitude of an alternating-current voltage that is generated by the stator, the voltage regulator being disposed outside the first axial end of the casing; a resin protective cover that is formed so as to have a cup shape that is constituted by a bottom portion and a tubular peripheral wall portion, and that is mounted to the casing so as to cover the rectifier and the voltage regulator; and a resin harness clamp that fixes electrical wiring. In addition, the automotive rotary electric machine includes: a mounting bolt that is inserted through a penetrating aperture that is formed on the bottom portion of the protective cover and that is fixed to a portion of the casing at the first axial end; and a metal mounting device that is fixed to a portion of the mounting bolt that projects out through the penetrating aperture, the harness clamp being held by the metal mounting device.

Effects of the Invention

According to the present invention, a mounting bolt is inserted through a penetrating aperture that is formed on a bottom portion of a protective cover and is fixed to a portion of the casing at a first axial end, and a metal mounting device is fixed to a portion of the mounting bolt that projects out through the penetrating aperture. Thus, because the harness clamp is held by the metal mounting device, the supporting strength of the harness clamp is increased, suppressing vibration of the electrical wiring that is fixed by the harness clamp that results from vehicle vibration, thereby enabling the occurrence of wire breakages in the electrical wiring to be suppressed. In addition, because the protective cover does not constitute a supporting member for the electrical wiring, the occurrence of damage to the protective cover that results from vibration of the electrical wiring can be prevented.

DESCRIPTION OF EMBODIMENTS

Preferred embodiments of an automotive rotary electric machine according to the present invention will now be explained with reference to the drawings.

Embodiment 1

Figure 1:
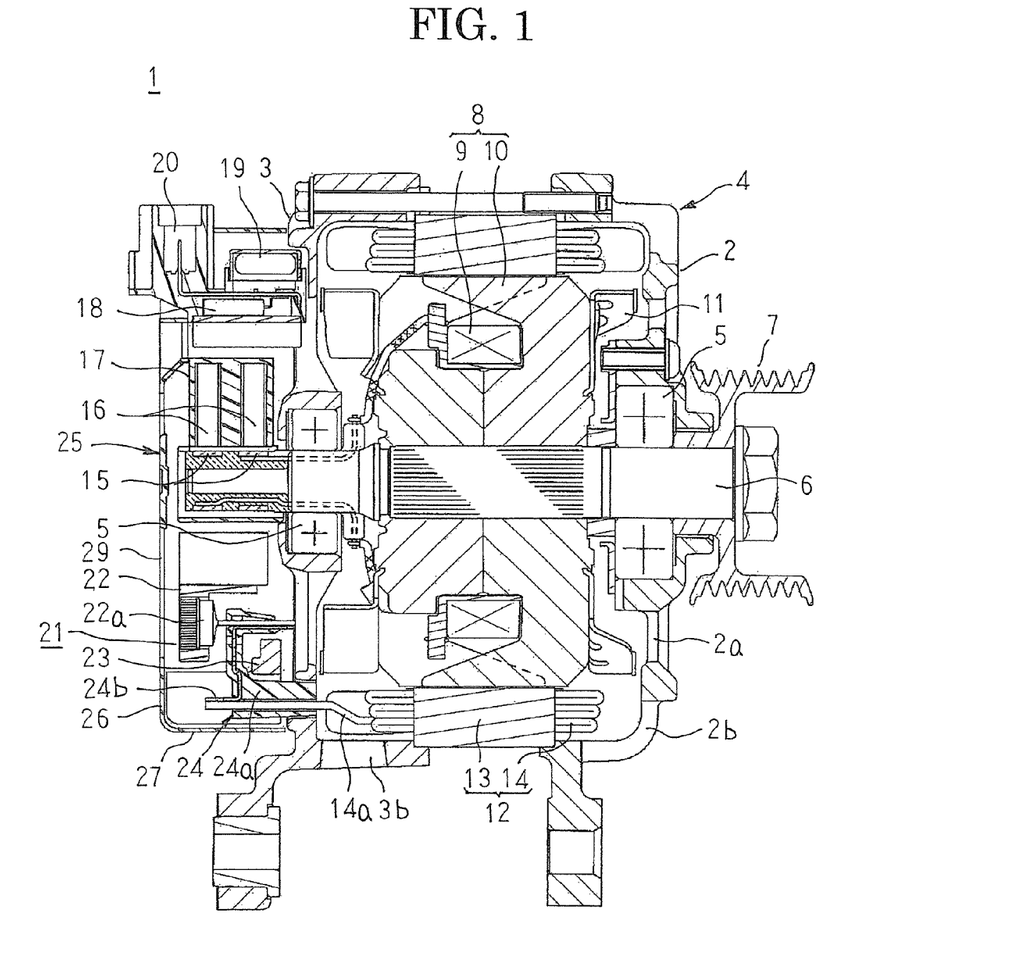
FIG. 1 is a cross section that shows an automotive alternator according to Embodiment 1 of the present invention.
Figure 2:
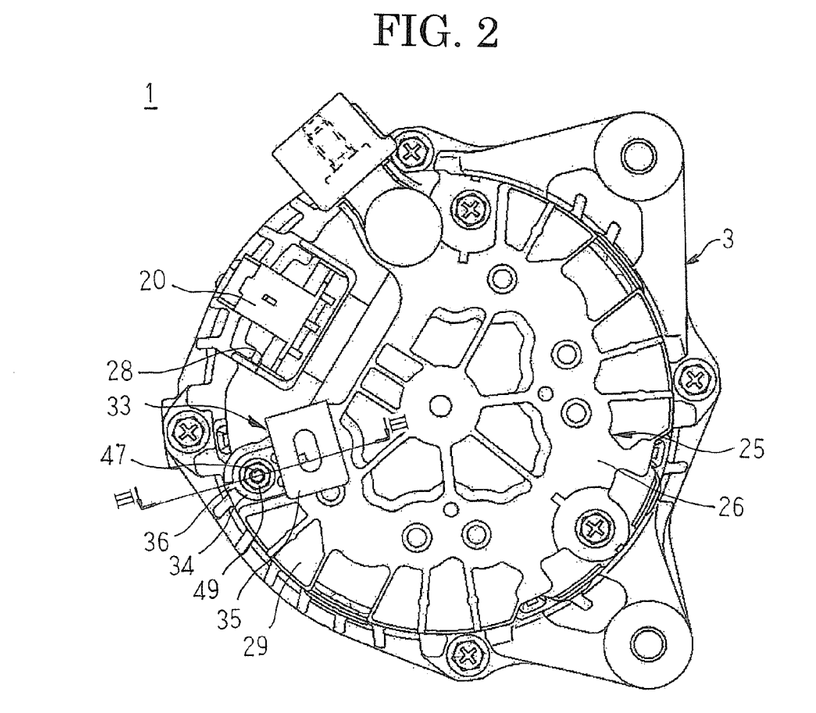
FIG. 2 is a rear-end end elevation that shows the automotive alternator according to Embodiment 1 of the present invention.
Figure 3:
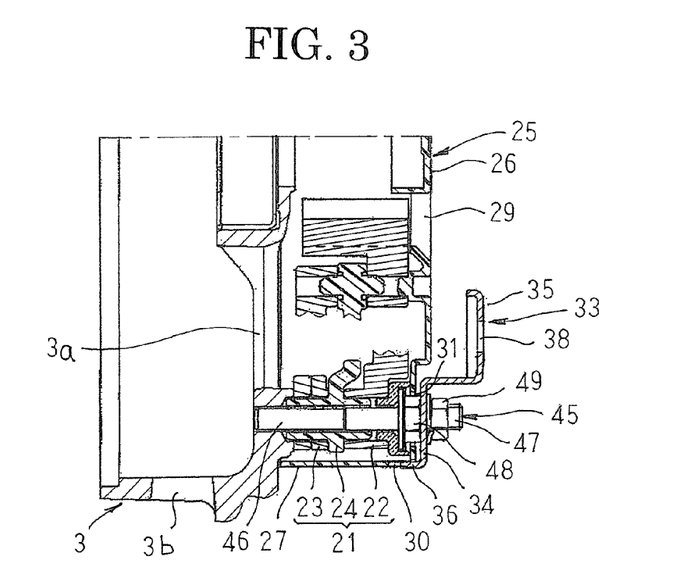
FIG. 3 is a cross section that is taken along Line III-III in FIG. 2 so as to be viewed in the direction of the arrows.
Figure 4:
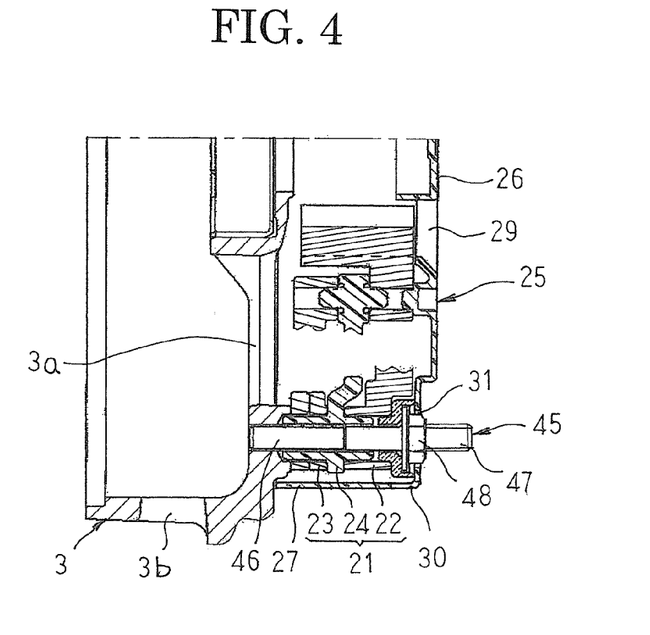
FIG. 4 is a partial cross section that shows a state before a metal mounting device is mounted in the automotive alternator according to Embodiment 1 of the present invention.
Figure 5:
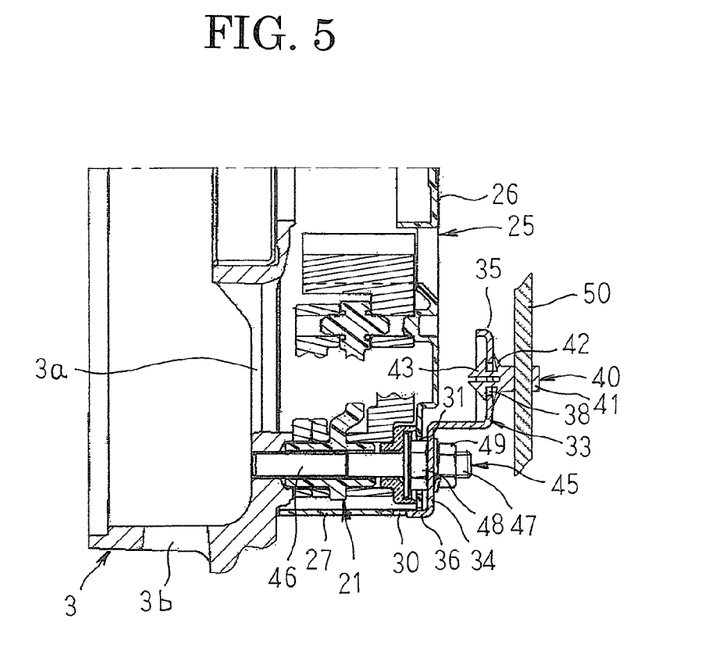
FIG. 5 is a partial cross section that shows a fixed state of electrical wiring in the automotive alternator according to Embodiment 1 of the present invention.
Figure 6:
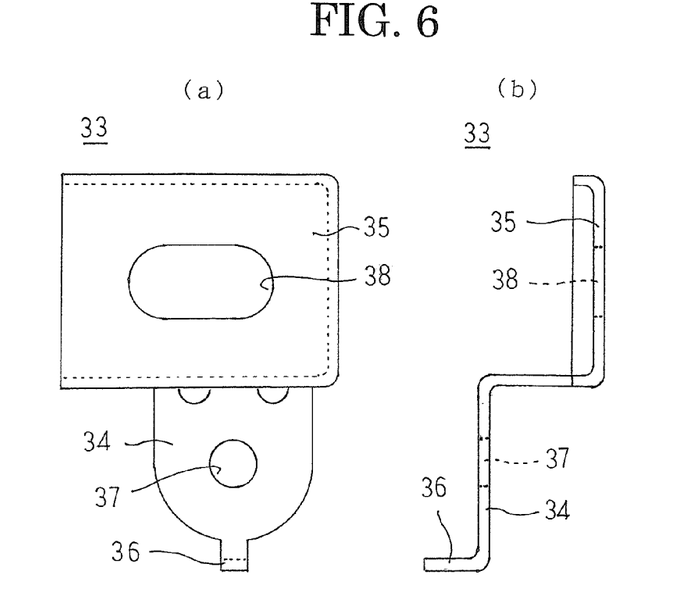
FIG. 6 is a diagram that explains a configuration of the metal mounting device in the automotive alternator according to Embodiment 1 of the present invention.
Figure 7:
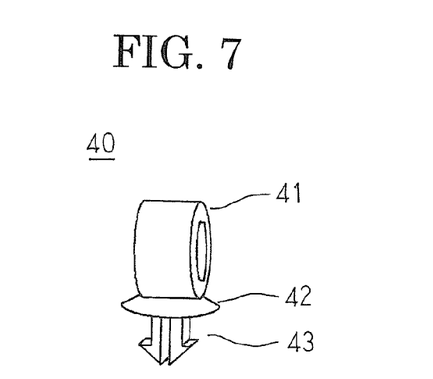
FIG. 7 is a perspective that shows a harness clamp in the automotive alternator according to Embodiment 1 of the present invention.
Figure 8:
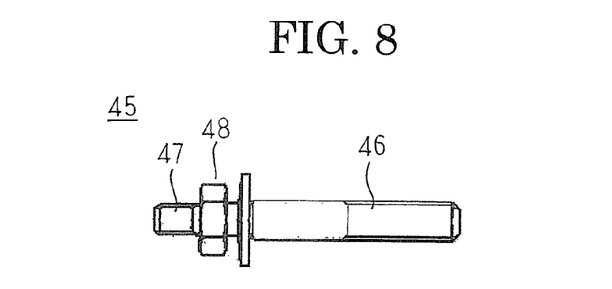
FIG. 8 is a side elevation that shows a stud bolt in the automotive alternator according to Embodiment 1 of the present invention.

FIG. 1 is a cross section that shows an automotive alternator according to Embodiment 1 of the present invention, FIG. 2 is a rear-end end elevation that shows the automotive alternator according to Embodiment 1 of the present invention, FIG. 3 is a cross section that is taken along Line III-III in FIG. 2 so as to be viewed in the direction of the arrows, FIG. 4 is a partial cross section that shows a state before a metal mounting device is mounted in the automotive alternator according to Embodiment 1 of the present invention, and FIG. 5 is a partial cross section that shows a fixed state of electrical wiring in the automotive alternator according to Embodiment 1 of the present invention. FIG. 6 is a diagram that explains a configuration of the metal mounting device in the automotive alternator according to Embodiment 1 of the present invention, FIG. 6(a) being a top plan, and FIG. 6(b) being a side elevation. FIG. 7 is a perspective that shows a harness clamp in the automotive alternator according to Embodiment 1 of the present invention, and FIG. 8 is a side elevation that shows a stud bolt in the automotive alternator according to Embodiment 1 of the present invention.

In FIGS. 1 through 3, an automotive alternator 1 includes: a casing 4 that is constituted by a front bracket 2 and a rear bracket 3 that are each approximately cup-shaped and made of aluminum; a shaft 6 that is rotatably supported in the casing 4 by means of a pair of bearings 5; a pulley 7 that is fixed to an end portion of the shaft 6 that projects out frontward from the casing 4; a rotor 8 that is fixed to the shaft 6 and that is disposed inside the casing 4; fans 11 that are fixed to two axial end surfaces of the rotor 8; a stator 12 that is fixed to the casing 4 so as to surround the rotor 8; a pair of slip rings 15 that are fixed to a portion of the shaft 6 that projects out rearward from the casing 4 and that supply electric current to the rotor 8; a pair of brushes 16 that slide on respective surfaces of the slip rings 15; a brush holder 17 that accommodates the brushes 16; a voltage regulator 18 that adjusts magnitudes of alternating-current voltages that are generated in the stator 12; a noise-preventing capacitor 19 that is mounted onto the voltage regulator 18; a connector 20 that is formed integrally on the voltage regulator 18, and that performs input and output of signals between the voltage regulator 18 and external devices (not shown); a rectifier 21 that is disposed at the rear end of the rear bracket 3, and that rectifies the alternating-current voltages that are generated in the stator 12 into a direct-current voltage; a protective cover 25 that is mounted onto the rear bracket 3 so as to cover the brush holder 17, the voltage regulator 18, and the rectifier 21, as described below; and a metal mounting device 33 onto which is mounted a harness clamp 40 that is described below.

A plurality of air intake apertures 2a and 3a are formed on bottom portions of the approximate cup shapes of the front bracket 2 and the rear bracket 3, and a plurality of air discharge apertures 2b and 3b are formed on two outer circumferential shoulder portions of the front bracket 2 and the rear bracket 3.

The rotor 8 is a Lundell rotor, and includes: a field winding 9 that generates magnetic flux on passage of an excitation current; and a field core 10 that is disposed so as to cover the field winding 9, and in which magnetic poles are formed by the magnetic flux. The stator 12 includes: a cylindrical stator core 13; and a stator winding 14 that is mounted into the stator core 13, and in which alternating currents are generated by changes in the magnetic flux from the field winding 9 that accompany rotation of the rotor 8. The stator 12 is disposed such that the stator core 13 is held between opening ends of the front bracket 2 and the rear bracket 3 from two axial ends so as to surround the rotor 8.

The rectifier 21 includes: a positive-side heatsink 22 to which a plurality of positive-side rectifying elements 22a are mounted; a negative-side heatsink 23 to which a plurality of negative-side rectifying elements (not shown) are mounted; and a circuit board 24, and is configured into an approximate C shape in which the circuit board 24 is inserted between the positive-side heatsink 22 and the negative-side heatsink 23.

The circuit board 24 includes: a resin-molded body 24a that is formed so as to have an approximate C shape; and a plurality of conductors 24b that are insert-molded into the resin-molded body 24a so as to connect the rectifier 21 and the stator windings 14 electrically. The plurality of conductors 24b are formed such that the positive-side rectifying elements 22a and the negative-side rectifying elements constitute a predetermined bridge circuit. As shown in FIG. 8, a stud bolt 45 that functions as a mounting bolt is formed integrally such that first and second shaft portions 46 and 47 that have external screw thread portions are disposed coaxially on opposite sides of a nut portion 48.

As shown in FIG. 3, a rectifier 21 that is configured in this manner is stacked such that the positive-side heatsink 22 and the negative-side heatsink 23 are positioned on opposite sides of the circuit board 24, and is fixed by inserting the first shaft portion 46 of the stud bolt 45 through the positive-side heatsink 22, the circuit board 24, and the negative-side heatsink 23 and fastening the first shaft portion 46 to an outer end surface of the rear bracket 3. The rectifier 21 is thereby disposed in a fan shape that is centered around the shaft 6 in a plane that is perpendicular to a central axis of the shaft 6. Output wires 14a of the stator winding 14 are led out through the rear bracket 3 and are connected to the conductors 24b of the circuit board 24 to connect the rectifier 21 and the stator winding 14 electrically.

The brush holder 17 is disposed between two circumferential end portions of the approximate C shape of the rectifier 21, and is fastened to the outer end surface of the rear bracket 3. The voltage regulator 18, onto which the capacitor 19 and the connector 20 are mounted integrally, is disposed radially outside the brush holder 17 between two circumferential end portions of the approximate C shape of the rectifier 21, and is fastened to the outer end surface of the rear bracket 3.

The protective cover 25 is formed into a floored cylindrical shape that is constituted by a bottom portion 26 and a cylindrical peripheral wall portion 27 using an electrically insulating resin such as polybutylene terephthalate (PBT), nylon 66, etc. A connector outlet aperture 28 is formed by cutting away a portion of the bottom portion 26 and the peripheral wall portion 27 of the protective cover 25. A plurality of air intake apertures 29 are formed on the bottom portion 26. As shown in FIG. 4, a drainage aperture 30 is formed on the peripheral wall portion 27 near the bottom portion 26, and a penetrating aperture 31 that allows passage of the second shaft portion 47 of the stud bolt 45 is formed on the bottom portion 26 in close proximity to the drainage aperture 30. Moreover, the drainage aperture 30 is formed at a position on the peripheral wall portion 27 near the ground, i.e., that faces vertically downward, when the automotive alternator 1 is mounted to a vehicle.

A protective cover 25 that is configured in this manner is mounted onto the rear bracket 3 such that an opening end is oriented toward the rear bracket 3 so as to cover the rectifier 21, the brush holder 17, and the voltage regulator 18. At this point, the connector 20 projects out through the connector outlet aperture 28, and the nut portion 48 and the second shaft portion 47 of the stud bolt 45 project out through the penetrating aperture 31.

As shown in FIG. 6, the metal mounting device 33 is formed by press-molding a flat metal sheet such as a stainless alloy, for example, and has: a mounting portion 34; a holding portion 35 that is disposed so as to extend integrally from a first end of the mounting portion 34; and a rotation arresting portion 36 that is formed so as to be bent perpendicularly from a second end of the mounting portion 34. A stud bolt passage aperture 37 is disposed so as to pass through the mounting portion 34, and a harness clamp holding aperture 38 is disposed so as to pass through the holding portion 35.

As shown in FIG. 3, the metal mounting device 33 is mounted such that the second shaft portion 47 that projects out through the penetrating aperture 31 is inserted into the stud bolt passage aperture 37, and the mounting portion 34 is fixed to the stud bolt 45 so as to be held between the nut 49 and the nut portion 48 by the fastening force from the nut 49 that is screwed onto the second shaft portion 47. At this point, the rotation arresting portion 36 is fitted into the drainage aperture 30 to prevent the metal mounting device 33 from also turning during the fastening of the nut 49.

The harness clamp 40 is a resin-molded body in which an insulating resin such as polybutylene terephthalate (PBT), nylon 66, etc., is used, and as shown in FIG. 7, includes: a holding portion 41 that holds electrical wiring 50; a seat portion 42 that is formed on a first end of the holding portion 41; and a pair of snap-fitting hooks 43 that are disposed so as to extend from the seat portion 42.

To mount the harness clamp 40, the pair of snap-fitting hooks 43 are inserted into the harness clamp holding aperture 38 of the holding portion 35 so as to be coupled by snap-fitting. Thus, as shown in FIG. 5, the seat portion 42 sits on an outer circumferential surface of the holding portion 35, projecting portions on tips of the snap-fitting hooks 43 sit on an inner circumferential surface of the holding portion 35, and the harness clamp 40 is held by the holding portion 35. In addition, the electrical wiring 50 is fixed to the holding portion 41.

An automotive alternator 1 that is configured in this manner is mounted onto a vehicle, and a field current is supplied from a battery (not shown) through the brushes 16 and the slip rings 15 to the field winding 9 to generate magnetic flux. The claw-shaped magnetic poles of the field core 10 are magnetized by this magnetic flux such that North-seeking (N) poles and South-seeking (5) poles alternate circumferentially.

At the same time, rotational torque from an engine is transferred to the shaft 6 by means of a belt (not shown) and the pulley 7, rotating the rotor 8. Thus, rotating magnetic fields are applied to the stator winding 14 in the stator 12, generating electromotive forces in the stator winding 14. The alternating-current electromotive forces that are generated in the stator winding 14 are rectified into direct current by the rectifier 21, and magnitudes of output voltages therefrom are adjusted by the voltage regulator 18 and supplied to the battery, and to on-board electrical loads, etc.

The fans 11 are driven to rotate due to the rotation of the rotor 8, and a cooling airflow ventilation channel is formed inside the automotive alternator 1, as described below, effectively cooling heat-generating parts such as the stator winding 14, the rectifier 21, the voltage regulator 18, etc.

At the front end, air is sucked through the air intake apertures 2a into the front bracket 2, flows axially and reaches the rotor 8, and is deflected centrifugally by the fans 11. The air that has been deflected centrifugally cools coil ends of the stator winding 14, and is discharged outside the front bracket 2 through the air discharge apertures 2b. At the rear end, air is sucked through the air intake apertures 29 into the protective cover 25, cools the rectifier 21, the voltage regulator 18, etc., and flows toward the rear bracket 3. The air is sucked through the air intake apertures 3a into the rear bracket 3, flows axially and reaches the rotor 8, and is deflected centrifugally by the fans 11. The air that has been deflected centrifugally cools coil ends of the stator winding 14, and is discharged outside the rear bracket 3 through the air discharge apertures 3b.

According to Embodiment 1, the metal mounting device 33 is fastened to the stud bolt 45 that is fastened to the rear bracket 3, and the harness clamp 40 is held by the metal mounting device 33. Thus, supporting members of the harness clamp 40 are formed using a metal material, increasing the supporting strength of the harness clamp 40 significantly compared to conventional techniques in which protruding portions are disposed so as to protrude integrally from a resin protective cover. Vibration of the electrical wiring 50 that results from vehicle vibration, etc., is suppressed, suppressing the occurrence of wire breakages of the electrical wiring 50.

Because the metal mounting device 33 is mounted onto the stud bolt 45 by fastening forces from the nut 49 and the nut portion 48, the metal mounting device 33 can be mounted to the stud bolt 45 simply and firmly.

Because the metal mounting device 33 is supported by the stud bolt 45 that fastens the rectifier 21 to the rear bracket 3, it is not necessary to prepare a mounting bolt that supports the metal mounting device 33 separately. Thus, the number of parts in the automotive alternator 1 is reduced, and assembly is improved.

Because the protective cover 25 does not contribute to the supporting construction of the harness clamp 40, the rear bracket 3 can support the harness clamp 40 irrespective of the shape of the protective cover 25, increasing the degree of design freedom of the protective cover 25.

During mounting of the metal mounting device 33, the rotation arresting portion 36 is inserted into the drainage aperture 30. Thus, when fastening the nut 49, the metal mounting device 33 is prevented from also turning, improving workability when mounting the metal mounting device 33. Even if a pivoting force around the second shaft portion 47 acts on the metal mounting device 33 by means of the electrical wiring 50 and the harness clamp 40, decreases in the fastening force from the nut 49 can be suppressed because the pivoting of the metal mounting device 33 around the second shaft portion 47 is stopped. In addition, it is not necessary to dispose an engaging portion especially for the rotation arresting portion 36 of the metal mounting device 33 separately on the protective cover 25, enabling the shape of the protective cover 25 to be simplified.

The protective cover 25 is mounted onto the rear bracket 3 so as to cover the rectifier 21 and the voltage regulator 18, which are disposed axially outside the rear bracket 3. Thus, the protective cover 25 stops the collision of airborne foreign matter into the rectifier 21 and the voltage regulator 18.

Because the drainage aperture 30 is formed on the peripheral wall portion 27 so as to be positioned vertically below the protective cover 25, even if the protective cover 25 is exposed to moisture, the water promptly flows out through the drainage aperture 30.

Embodiment 2

Figure 9:
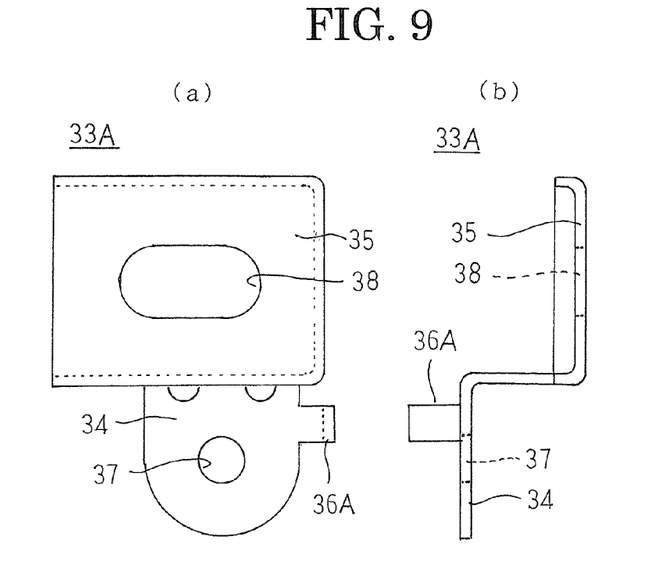
FIG. 9 is a diagram that explains a configuration of a metal mounting device in an automotive alternator according to Embodiment 2 of the present invention.
Figure 10:
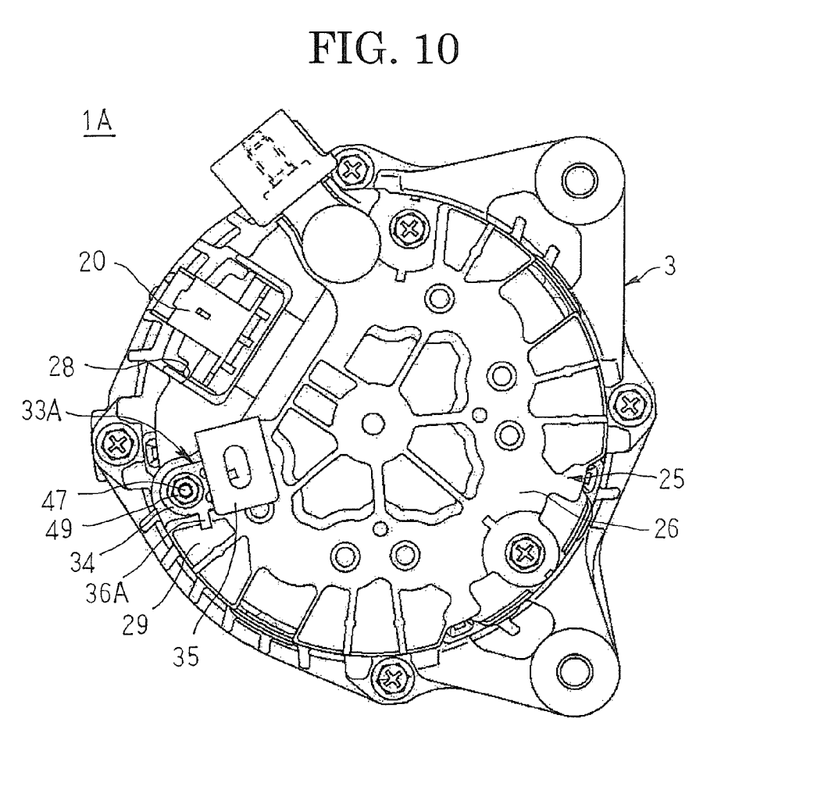
FIG. 10 is a rear-end end elevation that shows the automotive alternator according to Embodiment 2 of the present invention.

FIG. 9 is a diagram that explains a configuration of the metal mounting device in the automotive alternator according to Embodiment 2 of the present invention, FIG. 9A being a top plan, and FIG. 9B being a side elevation. FIG. 10 is a rear-end end elevation that shows the automotive alternator according to Embodiment 2 of the present invention.

In FIG. 9, a metal mounting device 33A includes a rotation arresting portion 36A that is formed so as to be bent perpendicularly from a first end of a mounting portion 34.

Moreover, the rest of the configuration is formed in a similar or identical manner to that of Embodiment 1 above.

In Embodiment 2, in a similar manner to Embodiment 1 above, the metal mounting device 33A is mounted such that the second shaft portion 47 that projects out through the penetrating aperture 31 is inserted into the stud bolt passage aperture 37, and the mounting portion 34 is fixed to the stud bolt 45 so as to be held between the nut 49 and the nut portion 48 by the fastening force from the nut 49 that is screwed onto the second shaft portion 47. At this point, as shown in FIG. 10, the rotation arresting portion 36A is fitted into an air intake aperture 29 that is adjacent to the penetrating aperture 31 to prevent the metal mounting device 33A from also turning during the fastening of the nut 49.

In an automotive alternator 1A that is configured in this manner, the metal mounting device 33A is also fixed to the second shaft portion 47 of the stud bolt 45 by the fastening forces from the nut 49 and the nut portion 48, and the harness clamp 40 is held by the metal mounting device 33A. In addition, the rotation arresting portion 36A of the metal mounting device 33A is fitted into an air intake aperture 29 that is adjacent to the penetrating aperture 31. Consequently, similar or identical effects to those of Embodiment 1 above can also be achieved in Embodiment 2.

Moreover, in each of the above embodiments, explanation is given for an automotive alternator, but the present invention is not limited to automotive alternators, and similar effects are also exhibited if the present invention is applied to automotive dynamoelectric machines such as automotive electric motors, or automotive generator-motors.

In each of the above embodiments, the peripheral wall portion of the protective cover is formed so as to have a cylindrical shape, but the shape of the peripheral wall portion of the protective cover is not limited to a cylindrical shape, provided that it is a tubular shape that surrounds the rectifier and the voltage regulator that are mounted to the outer end surface of the rear bracket.

In each of the above embodiments, the metal mounting device is mounted onto the rear bracket using a stud bolt that fastens the rectifier to the rear bracket, but a metal mounting device may also be mounted onto the rear bracket using a dedicated mounting bolt.

The invention claimed is:

1. An automotive rotary electric machine comprising:
a rotor that is disposed inside a casing so as to be fixed to a shaft that is rotatably supported by said casing;
a stator comprising:
  a stator core; and
  a stator winding that is mounted onto said stator core, said stator being supported by said casing so as to surround said rotor;
a rectifier that rectifies alternating-current electric power that is generated by said stator winding, said rectifier being fixed to said casing so as to be disposed outside a first axial end of said casing;
a voltage regulator that adjusts magnitude of an alternating-current voltage that is generated by said stator, said voltage regulator being disposed outside said first axial end of said casing;
a resin protective cover that is formed so as to have a cup shape that is constituted by a bottom portion and a tubular peripheral wall portion, and that is mounted to said casing so as to cover said rectifier and said voltage regulator;
a resin harness clamp that fixes electrical wiring;
a mounting bolt that is inserted through a penetrating aperture that is formed on said bottom portion of said protective cover and that is fixed to a portion of said casing at said first axial end; and
a metal mounting device formed as a separate and distinct component of the automotive rotary electric machine relative to the protective cover, the metal mounting device being fixed to a portion of said mounting bolt that projects out through said penetrating aperture, said harness clamp being held by said metal mounting device.

2. An automotive rotary electric machine according to claim 1, wherein:
said metal mounting device is fixed to said portion of said mounting bolt that projects out through said penetrating aperture by fastening forces from a pair of nuts.

3. An automotive rotary electric machine according to claim 2, wherein:
a drainage aperture is formed on said peripheral wall portion of said protective cover; and
said metal mounting device comprises a rotation arresting portion that engages with said drainage aperture to stop rotation of said metal mounting device.

4. An automotive rotary electric machine according to claim 2, wherein:
an air intake aperture is formed on said bottom portion of said protective cover; and
said metal mounting device comprises a rotation arresting portion that engages with said air intake aperture to stop rotation of said metal mounting device.

5. An automotive rotary electric machine according to claim 2, wherein:
said pair of nuts comprises a first nut and a second nut; and
said first nut of said pair of nuts projects through said penetrating aperture of said protective cover thereby providing a raised surface spaced apart from an exterior surface of said bottom portion of said protective cover.

6. An automotive rotary electric machine according to claim 5, wherein:
said metal mounting device comprises a mounting portion held between said first nut and said second nut such that said mounting portion is held in a position spaced apart from said exterior surface of said protective cover.

7. An automotive rotary electric machine according to claim 1, wherein:
said mounting bolt also functions as a bolt that fixes said rectifier to said casing.

8. An automotive rotary electric machine according to claim 1, wherein:
said metal mounting device comprises a holding portion spaced apart from an exterior surface of said bottom portion of said protective cover.

9. An automotive rotary electric machine according to claim 8, wherein:
said holding portion of said metal mounting device comprises a harness clamp holding aperture configured to hold said harness clamp such that said harness clamp is held in a position spaced apart from said exterior surface of said protective cover.

* * * * *